(12) United States Patent
Machamer

(10) Patent No.: US 9,422,853 B2
(45) Date of Patent: Aug. 23, 2016

(54) TRAPPED SOOT MEASUREMENT

(75) Inventor: Thomas Edward Machamer, Melrose Park, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/383,157

(22) PCT Filed: Mar. 9, 2012

(86) PCT No.: PCT/US2012/028485
§ 371 (c)(1),
(2), (4) Date: Sep. 5, 2014

(87) PCT Pub. No.: WO2013/133849
PCT Pub. Date: Sep. 12, 2013

(65) Prior Publication Data
US 2015/0020508 A1    Jan. 22, 2015

(51) Int. Cl.
*F01N 3/00* (2006.01)
*F01N 3/02* (2006.01)
*F01N 3/10* (2006.01)
*F01N 3/20* (2006.01)
*F01N 11/00* (2006.01)
*F01N 9/00* (2006.01)
*F01N 3/021* (2006.01)

(52) U.S. Cl.
CPC .............. *F01N 11/00* (2013.01); *F01N 3/021* (2013.01); *F01N 9/002* (2013.01); *F01N 2560/05* (2013.01); *F01N 2560/12* (2013.01); *F01N 2900/1602* (2013.01); *F01N 2900/1606* (2013.01); *Y02T 10/20* (2013.01); *Y02T 10/47* (2013.01)

(58) Field of Classification Search
USPC .............. 60/277, 297, 311; 95/283; 55/282.2, 55/282.3, 385.3, 428.1, DIG. 10, DIG. 30
See application file for complete search history.

(56) References Cited

U.S. PATENT DOCUMENTS

| | | | |
|---|---|---|---|
| 4,307,061 A | 12/1981 | Sarholz | |
| 2008/0078236 A1* | 4/2008 | Mital et al. | 73/38 |
| 2010/0000404 A1* | 1/2010 | Sakuma et al. | 95/3 |
| 2010/0107737 A1* | 5/2010 | Krafthefer et al. | 73/28.01 |

\* cited by examiner

*Primary Examiner* — Jesse Bogue
*Assistant Examiner* — Dapinder Singh
(74) *Attorney, Agent, or Firm* — Jack D. Nimz; Jeffrey P. Calfa

(57) ABSTRACT

A quantity of soot trapped in a particulate filter in an engine exhaust system is calculated for use in a regeneration control strategy by drawing electric current from an electric power supply through a circuit which comprises in series an internal portion of the particulate filter and an electric impedance external to the filter. At least one electric measurement device connected to the circuit provides circuit-related data sufficient to enable a processor to calculate temperature-adjusted electric resistance of soot trapped in the internal portion of the particulate filter by calculating non-temperature-adjusted electric resistance of soot trapped in the internal portion of the particulate filter and temperature-adjusting a calculation of non-temperature-adjusted electric resistance of soot trapped in the internal portion of the particulate filter based on temperature data from a source of temperature data indicative of an internal temperature of the particulate filter.

10 Claims, 2 Drawing Sheets

TRAPPED SOOT MEASUREMENT

TECHNICAL FIELD

This disclosure relates to particulate filters for trapping particulate matter in products of combustion flowing through an exhaust system, especially particulate matter in diesel engine exhaust.

BACKGROUND

In a motor vehicle which is being propelled by a diesel engine, diesel exhaust after-treatment may include a device, such as a diesel particulate filter (DPF), for trapping particulate matter so that the trapped matter doesn't escape into the surrounding atmosphere. Soot is a particulate constituent of engine-out exhaust and may become a significant constituent during certain engine operating conditions.

A DPF is occasionally regenerated in order to maintain soot trapping efficiency. Regeneration may occur naturally under conditions conducive to natural regeneration, but regeneration may also be forced when the quantity of trapped soot reaches a level which begins to degrade engine performance and/or soot trapping efficiency. Regeneration is forced by creating conditions which will burn off trapped soot. If a DPF is regenerated too frequently, fuel may be wasted, but if a DPF is not regenerated frequently enough, it may become clogged to a point where it can't be regenerated, and then has to be removed from the vehicle and baked in a special oven to unclog it.

As a diesel engine operates, an engine control system may from time to time calculate quantity of trapped soot to determine if regeneration should be forced.

A known strategy for determining a quantity of soot trapped in a DPF is based on pressure-flow relationships. For a given exhaust flow rate through a DPF, the difference between DPF inlet pressure and DPF outlet pressure is an indication of a quantity of soot trapped in the DPF. When an engine is operating in a steady state condition, i.e. at a substantially constant speed and a substantially constant load, pressure across, and flow through, a DPF are substantially constant. Sufficiently accurate measurements of those parameters can enable a sufficiently accurate calculation of trapped soot quantity to be made.

However, the manner in which motor vehicles are typically driven results in their engines not always operating in such a steady state condition. While steady state operation occurs during certain driving situations such as highway cruising, vehicle accelerations and decelerations create transients in engine operation. Accuracy of a calculation of trapped soot quantity made during a transient operating condition is problematic.

SUMMARY

The subject of the present disclosure relates to an alternate solution for calculating trapped soot which does not use pressure-flow relationships. Rather, the solution contemplates an apparatus and a method for calculating a quantity of trapped soot by use of resistance and temperature measurements.

DETAILED DESCRIPTION

Figure 1:
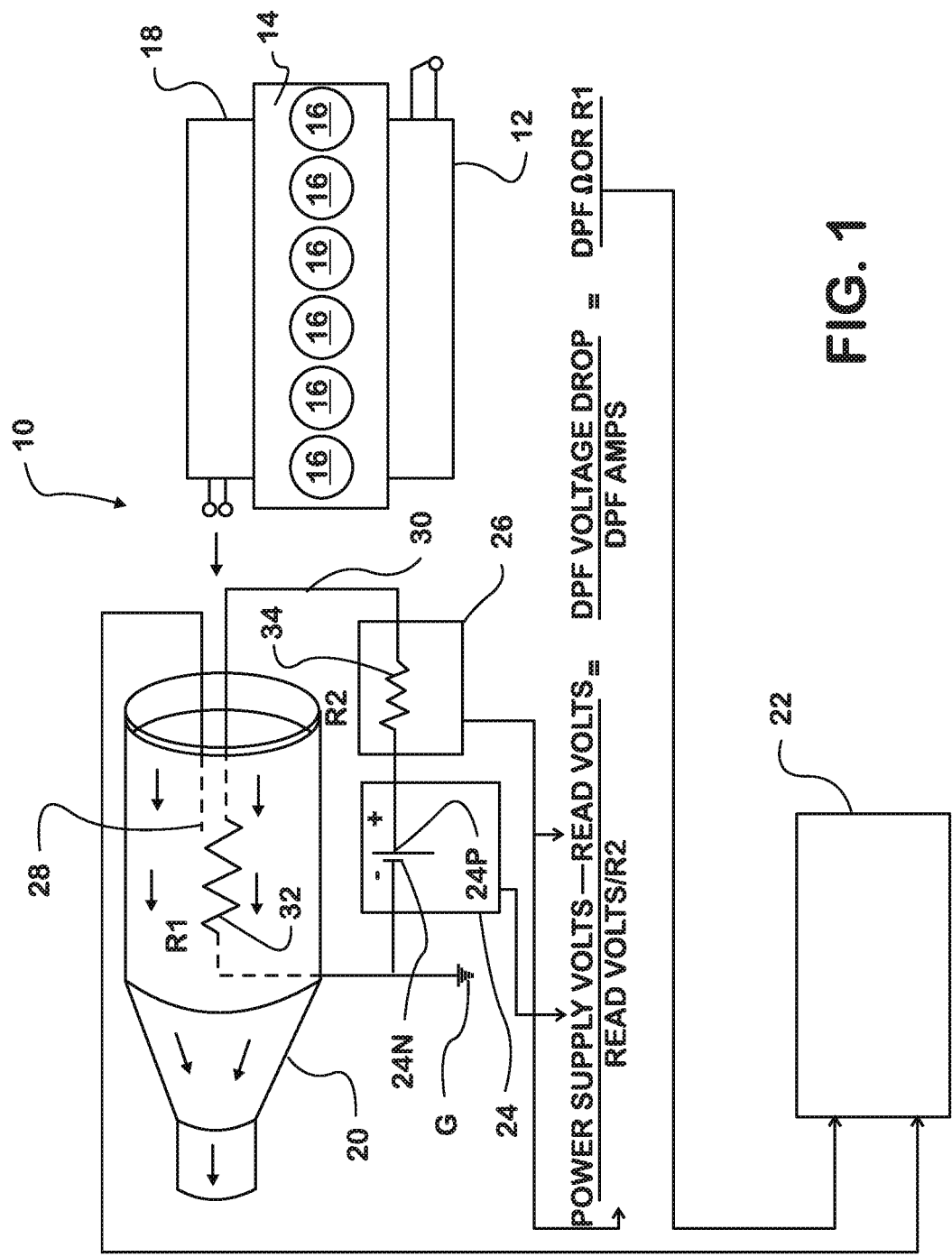
FIG. 1 is a schematic diagram of portions of an internal combustion engine.

FIG. 1 shows a diesel engine 10 having an intake system 12 leading to structure 14 forming engine cylinders 16 within which diesel fuel which has been injected by a fueling system combusts to operate the engine. An exhaust system 18 conveys exhaust which contains products of combustion from engine cylinders 16. Exhaust system 18 contains one or more exhaust after-treatment devices, one of which is a diesel particulate filter (DPF) 20 for trapping soot in products of diesel combustion flowing through exhaust system 18.

An engine control system comprises a processor 22 for processing various data from various sources to control certain aspects of engine operation as engine 10 operates, typically by repeated execution of programmed algorithms.

One such algorithm is contained in a particulate filter regeneration control strategy for initiating controlled regeneration of DPF 20. From time to time as engine 10 operates, the algorithm evaluates quantity of soot trapped in DPF 20 with respect to a limit. When the quantity exceeds the limit, the strategy requests regeneration. If engine operating conditions are suitable, regeneration is initiated.

Quantity of soot trapped in DPF 20 is calculated by associating with DPF 20 certain electric components including an electric power supply 24 presenting a supply voltage between positive and negative terminals 24P, 24N respectively, a voltmeter 26, and a temperature data source 28.

Voltmeter 26 is an electric measurement device for providing circuit-related data which is used by processor 22 in a calculation of non-temperature-adjusted electric resistance of soot trapped in DPF 20.

Temperature data source 28 comprises a temperature sensing zone of a sensor disposed within an internal portion of DPF 20 to provide an electric signal indicative of internal DPF temperature to processor 22 via high-temperature insulated wiring extending within the DPF to the DPF's exterior for connection to a data bus or other means for conveying internal DPF temperature data to processor 22 where it is used to temperature-adjust a calculation of non-temperature-adjusted electric resistance of soot trapped in DPF 20.

A circuit 30 conducts electric current from electric power supply 24 serially through an internal portion 32 of DPF 20 which contains trapped soot and an electric impedance 34 which is external to DPF 20. The illustrated example of electric impedance 34 is that of a conventional voltmeter which serves as voltmeter 26.

Voltmeter 26 is a device for reading voltage of a first terminal with respect to a second terminal, i.e. the potential difference between the first and second terminals. The conventional voltmeter 26 is connected to circuit 30 to read voltage at a first terminal of electric impedance 34 with respect to voltage at a second terminal of electric impedance 34. The first terminal of electric impedance 34 is itself directly connected to terminal 24P of electric power supply 24. Consequently voltmeter 26 reads voltage between a terminal of electric power supply 24 and a point in circuit 30 between electric impedance 34 and internal portion 32 of DPF 20, specifically reading voltage drop across electric impedance 34, which is circuit-related data supplied to processor 22.

Internal portion 32 has electric conductivity which is a function of quantity of trapped soot along a path of electric current flow through the trapped soot. Because soot has electric conductivity, the greater the quantity of soot trapped, the better the conductivity of the path, i.e. the smaller the impedance of the path.

DPF 20 comprises a substrate which has a geometry defining a tortuous flow path through which exhaust entering DPF 20 is forced to flow before exiting DPF 20. That flow path comprises features which cause soot to accumulate within DPF 20, i.e. to become trapped within DPF 20.

A first electric conductor which is exposed at one end of a first insulated high-temperature electric wire is held in any suitable manner at a location within DPF 20 at which soot will accumulate on the substrate. A second electric conductor which is exposed at one end of a second insulated high-temperature electric wire is held in any suitable manner at a location within DPF 20 at which soot will accumulate on the substrate and which is spaced from the location at which the exposed electric conductor of the first wire is located. The two locations are chosen to define opposite ends of a zone of the substrate along which soot will accumulate, and it is that zone which is represented by internal portion 32. In other words, one of those two locations is the terminus of the portion of circuit 30 coming from electric impedance 34, and the other location is the terminus of the portion of circuit 30 coming from ground G to which terminal 24N is connected.

The substrate itself should have a little or no electric conductivity if the exposed electric conductors of the wires are affixed to, or may come into contact with, the substrate. A DPF which has a ceramic substrate provides no electric conductivity.

Processor 22 processes data representing voltage read by voltmeter 26, data representing the voltage of electric power supply 24, and electric-current-indicative data which is indicative of magnitude of electric current drawn from electric power supply 24 by circuit 30 according to an algorithm to calculate non-adjusted electric resistance of soot trapped in internal portion 32 of DPF 20 between the opposite ends of the zone of the substrate along which soot accumulates.

FIG. 1 includes a mathematical formula for the calculation of non-adjusted electric resistance R1 of soot trapped in internal portion 32 of DPF 20. "Read Volts" is the voltage read by voltmeter 26, "Power supply volts" is the voltage of electric power supply 24 between terminals 24P and 24N, and R2 is the electric resistance in ohms of electric impedance 34. The calculation of R1 is based on Ohm's Law. The electric resistance of electric impedance 34 is an indicator of magnitude of electric current drawn from electric power supply 24 because the larger the electric resistance, the smaller the electric current draw, and vice versa.

The algorithm uses temperature data from the sensor of temperature data source 28 to temperature-adjust a calculation of non-adjusted electric resistance of soot trapped in internal portion 32.

Temperature adjustment is used because resistance of trapped soot present along internal portion 32 is a function of temperature. The sensor of temperature source 28 should therefore be placed in proximity to internal portion 32 if there is reason to believe that a different placement would not provide reasonably accurate temperature measurement. A different placement, even one on the outside housing of DPF 20, may nonetheless be acceptable if the sensor's measurement can be reasonably correlated with that of internal portion 32.

Figure 2:
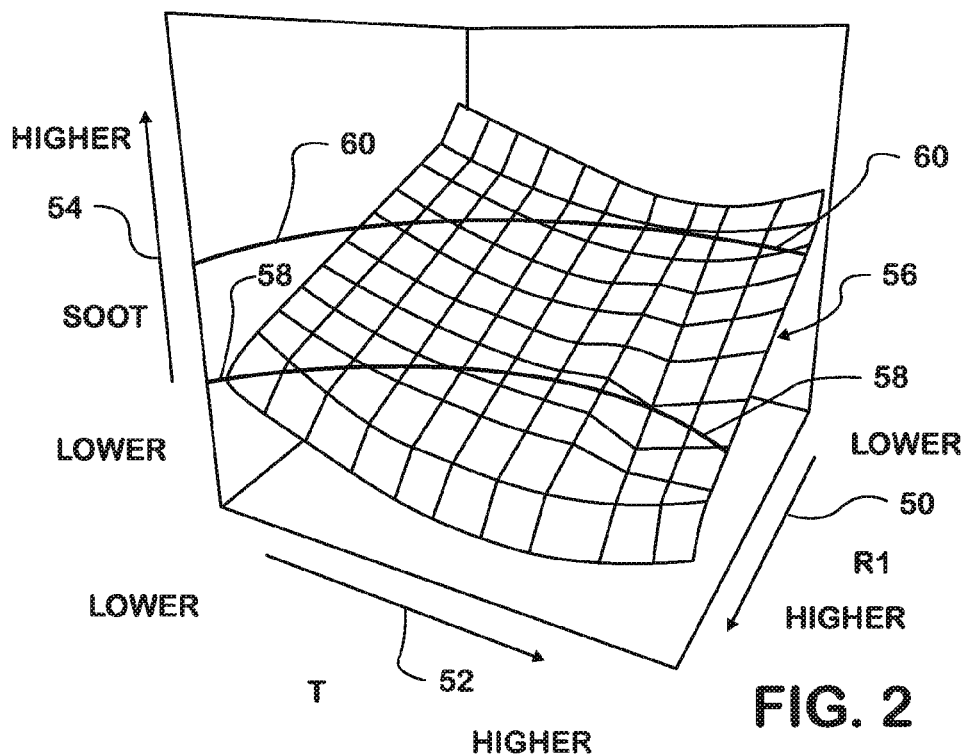
FIG. 2 is a three dimensional graph plot representative of quantity of trapped soot as a function of electric resistance and temperature.
Figure 3:
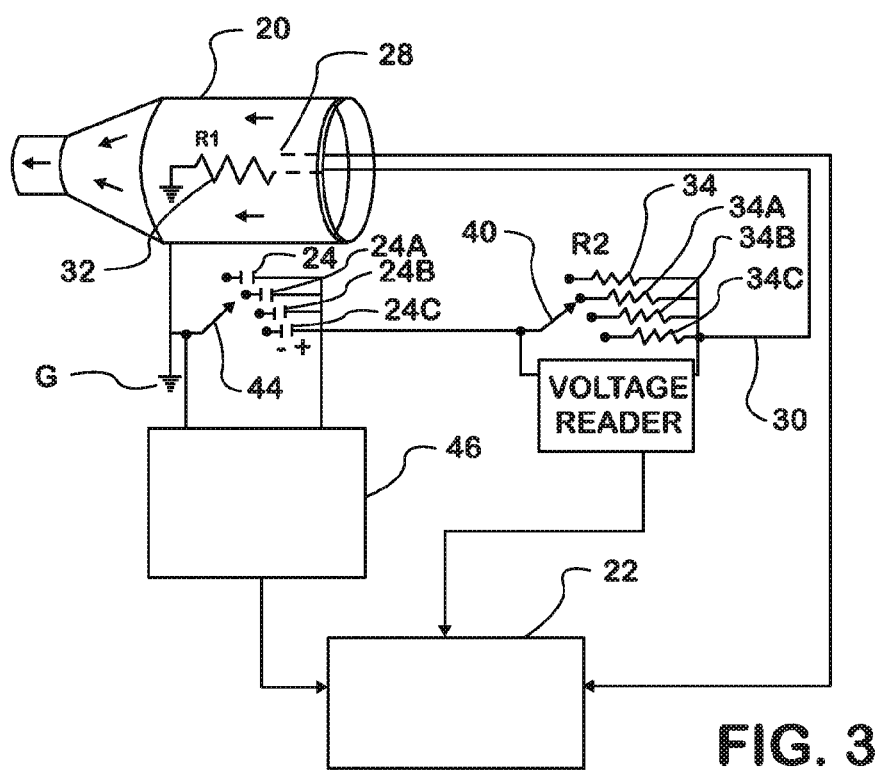
FIG. 3 is a schematic diagram similar to FIG. 1 with modifications.

Processor 22 uses a two-dimensional look-up table which is stored in memory to calculate quantity of trapped soot. That look-up table is based on a three-dimensional graph shown in FIG. 2. A first axis of the graph represents non-temperature-adjusted resistance of trapped soot R1 with arrow 50 indicating the direction in which resistance values increase. A second axis represents temperature data obtained from the sensor of temperature source 28 with arrow 52 indicating the direction in which temperature values increase. A third axis represents quantity of trapped soot with arrow 54 indicating the direction in which trapped soot values increase. A three-dimensional surface plot 56 defines trapped soot as a function of both temperature data obtained from the sensor of temperature source 28 and values of R1.

A first, and lower, constant value of trapped soot is indicated by the line 58. A second, and higher, constant value of trapped soot is indicated by the line 60. A location where each line intersects surface plot 56 defines the corresponding quantity of trapped soot with both a temperature along the second axis and a resistance along the first axis.

The look-up table comprises multiple values of quantity of trapped soot developed from intersections of each of multiple lines of constant values of trapped soot, such as lines 58 and 60, with three-dimensional surface plot 56, each quantity of trapped soot being correlated with a respective set of values for a temperature of the DPF and a non-adjusted electric resistance R1.

The particulate filter regeneration control strategy evaluates a calculated quantity of trapped soot against a soot limit.

FIG. 6 shows an alternate embodiment in which the same reference numerals that appear in FIG. 1 are used to identify the same elements. FIG. 6 differs from FIG. 1 in that multiple different electric impedances 34A, 34B, 34C additional to electric impedance 34 are present external to DPF 20. A selector switch 40 is operable to select one of the electric impedances for insertion into circuit 30 for setting a selected voltage range for reading by a voltage reader 42 connected across the selected electric impedance.

FIG. 6 further shows a selector switch 44 which is operable to select one of several additional electric power supplies 24A, 24B, 24C each providing a different voltage from that of power supply 24. A voltage reader 46 reads the voltage of the particular electric power supply selected for use by selector switch 44. Data from the two voltage readers 42, 46, and temperature data from temperature source 28 are supplied to processor 22 for processing in the same manner as explained above.

What is claimed is:

1. An internal combustion engine comprising:
    an exhaust system comprising a particulate filter for trapping soot in flow of products of combustion;
    a source of temperature data indicative of an internal temperature of the particulate filter;
    an electric power supply presenting a supply voltage between terminals;
    a circuit for conducting electric current from the electric power supply serially through an internal portion of the particulate filter upon which trapped soot is retained as the flow of products of combustion passes through the particulate filter and an electric impedance which is external to the particulate filter;
    a processor for calculating temperature-adjusted electric resistance of soot trapped in the internal portion of the particulate filter and for evaluating, in a particulate filter regeneration control strategy, a temperature-adjusted calculation of electric resistance of soot trapped in the internal portion of the particulate filter; and
    at least one electric impedance measurement device connected to the circuit for providing circuit-related data sufficient to enable the processor to calculate temperature-adjusted electric resistance of soot trapped in the internal portion of the particulate filter by calculating non-temperature-adjusted electric resistance of soot trapped in the internal portion of the particulate filter and temperature adjusting a calculation of non-temperature-adjusted electric resistance of soot trapped in the internal portion of the particulate filter based on temperature data from the source of temperature data indicative of an internal temperature of the particulate filter.

2. The internal combustion engine set forth in claim 1 in which the at least one electric measurement device is a voltmeter, for providing a voltage reading across the electric impedance which is external to the particulate filter.

3. The internal combustion engine set forth in claim 2 in which the electric impedance which is external to the particulate filter is one of several electric impedances, each of which can be selectively inserted into the circuit for setting a selected range of voltage readings by the device.

4. The internal combustion engine set forth in claim 1 in which the source of temperature data indicative of an internal temperature of the particulate filter comprises a temperature sensing element internal to the particulate filter.

5. The internal combustion engine set forth in claim 1 in which the regeneration control strategy comprises a look-up table which contains multiple quantities of soot each correlated with a respective data set comprising a temperature value and a non-temperature-adjusted value of electric resistance of soot trapped in the internal portion of the particulate filter, and in which the processor is arranged to select from the look-up table a quantity of soot correlated both with a calculated non-temperature-adjusted electric resistance value and with temperature data from the source of temperature data and to evaluate the selected quantity of soot in relation to a soot limit for requesting regeneration of the particulate filter when the selected quantity of soot exceeds the soot limit.

6. The internal combustion engine set forth in claim 1 in which the at least one electric measurement device further comprises a power supply voltage reader for providing a reading of voltage between terminals of the electric power supply to the processor.

7. A method for use in regenerating a particulate filter disposed downstream of an engine before the quantity of soot trapped in the particulate filter exceeds a soot limit, the method comprising:
providing at least one electric measurement device for sending a signal representative of the electric impedance associated with the amount of soot trapped in the particulate filter; providing a temperature sensor for sending a signal representative of the temperature of an internal portion of the particulate filter;
providing a processor operatively connected to the at least one electric measurement device and the temperature sensor for processing the signal representative of the electric impedance associated with the amount of soot trapped in the particulate filter and the signal representative of the temperature of the internal portion of the particulate filter;
the processor programmed to calculate temperature-adjusted electric resistance of the amount of soot trapped in the internal portion of the particulate filter using the temperature sensor signal and the electrical impedance signal;
the processor being programmed to initiate regeneration of the particulate filter when the temperature-adjusted electrical resistance of the amount of soot trapped in the internal portion of the particulate filter exceeds a value indicative of the soot level exceeding the soot limit; and
regenerating the particulate filter when the temperature-adjusted electrical resistance of the amount of soot trapped in the internal portion of the particulate filter exceeds a value indicative of the soot level exceeding the soot limit.

8. The method set forth in claim 7 wherein the at least one electric measurement device is programmed to performs the step of providing a voltage reading across the electric impedance which is external to the particulate filter.

9. The method set forth in claim 7 in which the step of providing temperature data from the temperature sensor comprises disposing the temperature sensor internal to the particulate filter.

10. The method set forth in claim 7 further comprising providing a look-up table which contains multiple quantities of soot each correlated with a respective data set comprising a temperature value and a non-temperature-adjusted value of electric resistance of soot trapped in the internal portion of the particulate filter, selecting from the look-up table a quantity of soot correlated both with a calculated non- temperature-adjusted electric resistance value and with temperature data from the temperature sensor, evaluating the selected quantity of soot in relation to the soot limit, and requesting regeneration of the particulate filter when the selected quantity of soot exceeds the soot limit.

* * * * *